US008292044B2

(12) United States Patent
Simons et al.

(10) Patent No.: US 8,292,044 B2
(45) Date of Patent: Oct. 23, 2012

(54) PNEUMATIC CONSTRICTING DRUM BRAKE ASSEMBLY

(75) Inventors: Philip N. Simons, Lorain, OH (US); Kurtis G. Whitling, Broadview Heights, OH (US)

(73) Assignee: Eaton Corporation, Cleveland, OH (US)

( * ) Notice: Subject to any disclaimer, the term of this patent is extended or adjusted under 35 U.S.C. 154(b) by 124 days.

(21) Appl. No.: 13/020,848

(22) Filed: Feb. 4, 2011

(65) Prior Publication Data

US 2011/0127131 A1 Jun. 2, 2011

Related U.S. Application Data

(63) Continuation-in-part of application No. 12/726,007, filed on Mar. 17, 2010, now abandoned.

(60) Provisional application No. 61/161,095, filed on Mar. 18, 2009.

(51) Int. Cl.
*F16D 49/14* (2006.01)

(52) U.S. Cl. ............... 188/77 W; 192/85.02; 192/12 C

(58) Field of Classification Search ............ 192/12 A, 192/12 C, 85.02, 103 F; 188/77 R, 77 W, 188/78, 152, 367
See application file for complete search history.

(56) References Cited

U.S. PATENT DOCUMENTS

| | | | |
|---|---|---|---|
| 2,331,180 A | 10/1943 | Glasser |
| 2,590,172 A | 3/1952 | Guier et al. |
| 2,649,316 A | 8/1953 | Beezley |
| 2,762,458 A | 9/1956 | Goepfrich et al. |
| 2,766,082 A | 10/1956 | Ritchey |
| 2,845,146 A | 7/1958 | Jones et al. |
| 3,162,270 A | 12/1964 | Demas et al. |
| 3,289,793 A | 12/1966 | Goldman et al. |
| 3,315,882 A | 4/1967 | Reed |
| 3,618,726 A | 11/1971 | Sugahara |
| 3,795,292 A | 3/1974 | Keller, Jr. |
| 4,222,470 A | 9/1980 | Beccaris |
| 4,497,398 A | 2/1985 | Patel |
| 5,174,839 A | 12/1992 | Schultz et al. |
| 5,259,486 A | 11/1993 | Deane |
| 6,416,057 B1 | 7/2002 | Adams et al. |
| 6,799,664 B1 | 10/2004 | Connolly |
| 2010/0236883 A1 | 9/2010 | Szpak et al. |

FOREIGN PATENT DOCUMENTS

CN 2291341 Y 6/1997

OTHER PUBLICATIONS

PCT International Search Report, Authorized Officer Blaine R. Copenheaver, Mailed May 10, 2012, Completed May 2, 2012, ISA/US, Commissioner for Patents, Alexandria Virginia, 3 pages.
Blaine R. Copenheaver, International Search Report for PCT/US2010/027659, mailed May 12, 2010, completed May 3, 2010, 9 pages, Alexandria, Virginia, USA.

*Primary Examiner* — Christopher Schwartz
(74) *Attorney, Agent, or Firm* — Fay Sharpe LLP

(57) ABSTRACT

A pneumatic constricting drum brake with rotary seals attached to opposite axial sides of the hub central region for sealing the hub and brake drum. Both rotary seals are accessible for replacement in service by removal of the housing side plate and brake drum without removal of the hub.

14 Claims, 6 Drawing Sheets ated Mar. 17, 2010 now
PNEUMATIC CONSTRICTING DRUM BRAKE ASSEMBLY

This disclosure is a Continuation-in-Part of U.S. patent application Ser. No. 12/726,007, filed Mar. 17, 2010 now abandoned entitled PNEUMATIC CONSTRICTING DRUM BRAKE ASSEMBLY, by Szpak et al., which claims priority from U.S. Provisional Patent Application No. 61/161,095, filed Mar. 18, 2009, entitled PNEUMATIC CONSTRICTING DRUM BRAKE ASSEMBLY, by Szpak et al., both of which are incorporated herein by reference in their entirety.

BACKGROUND

Problems have been encountered in service with pneumatic drum brakes and particularly constricting pneumatic drum brakes of the type having the inflatable tube disposed about the brake drum in keeping brake dust and foreign matter from entering the central hub region of the rotating drum.

In addition, in certain applications, such as for wind turbines, where electrical leads or components are disposed through the center region of the brake, it has been necessary to keep moisture, brake dust and foreign matter from such components. Where rotary seals are employed to prevent entry of moisture, brake dust and foreign matter from the central region of the brake, the need has arisen to provide access to the seals for replacement in service. In order to replace the seals, it has heretofore been necessary to completely disassemble the brake including the hub from the shaft or gearbox to which it is operatively connected, which, in situ, in wind turbine applications has been quite difficult and complex atop a tower and therefore quite costly. Thus, it has been desired to provide a pneumatic constricting drum brake with a sealed center hub and drum region where the seals may be readily accessed in service for replacement without complete disassembly of the brake and removal of the hub.

SUMMARY

The present disclosure describes a pneumatically operated constricting drum brake with rotary seals provided for the hub of the rotating drum on axially opposite sides of the hub for sealing the interior of the hub of the rotating drum from exterior contaminants such as moisture, brake dust, and foreign matter. The brake assembly of the present disclosure has the central region provided with rotary seals on opposite sides of the housing. Both seals may be accessed for replacement from the one side of the housing, opposite the input shaft, by removal of the side plate and the brake drum, without removal of the hub from the input shaft.

DETAILED DESCRIPTION

Figure 1:
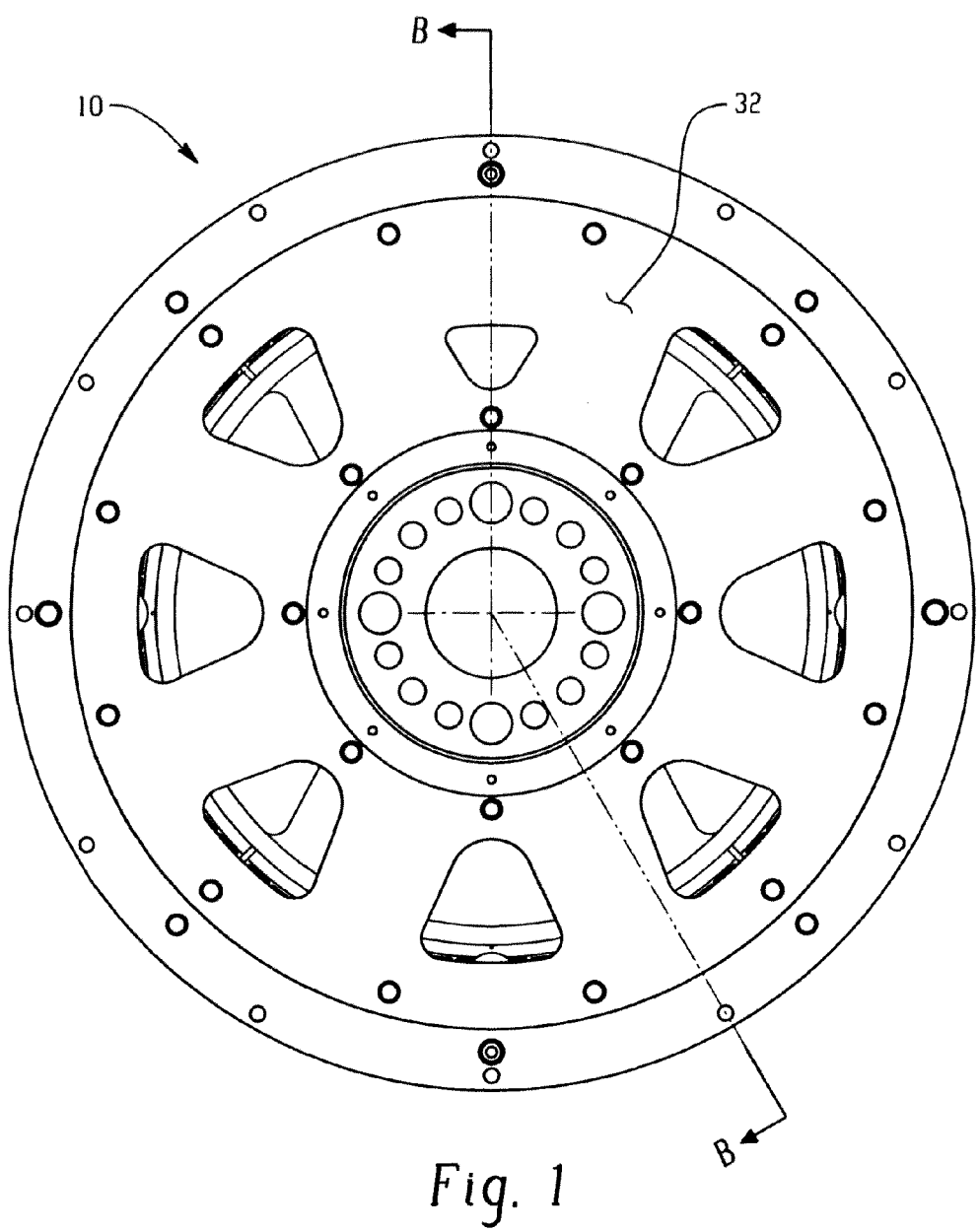
FIG. 1 is a side elevation view of one version of the brake assembly of the present disclosure showing a cover plate in place.
Figure 2:
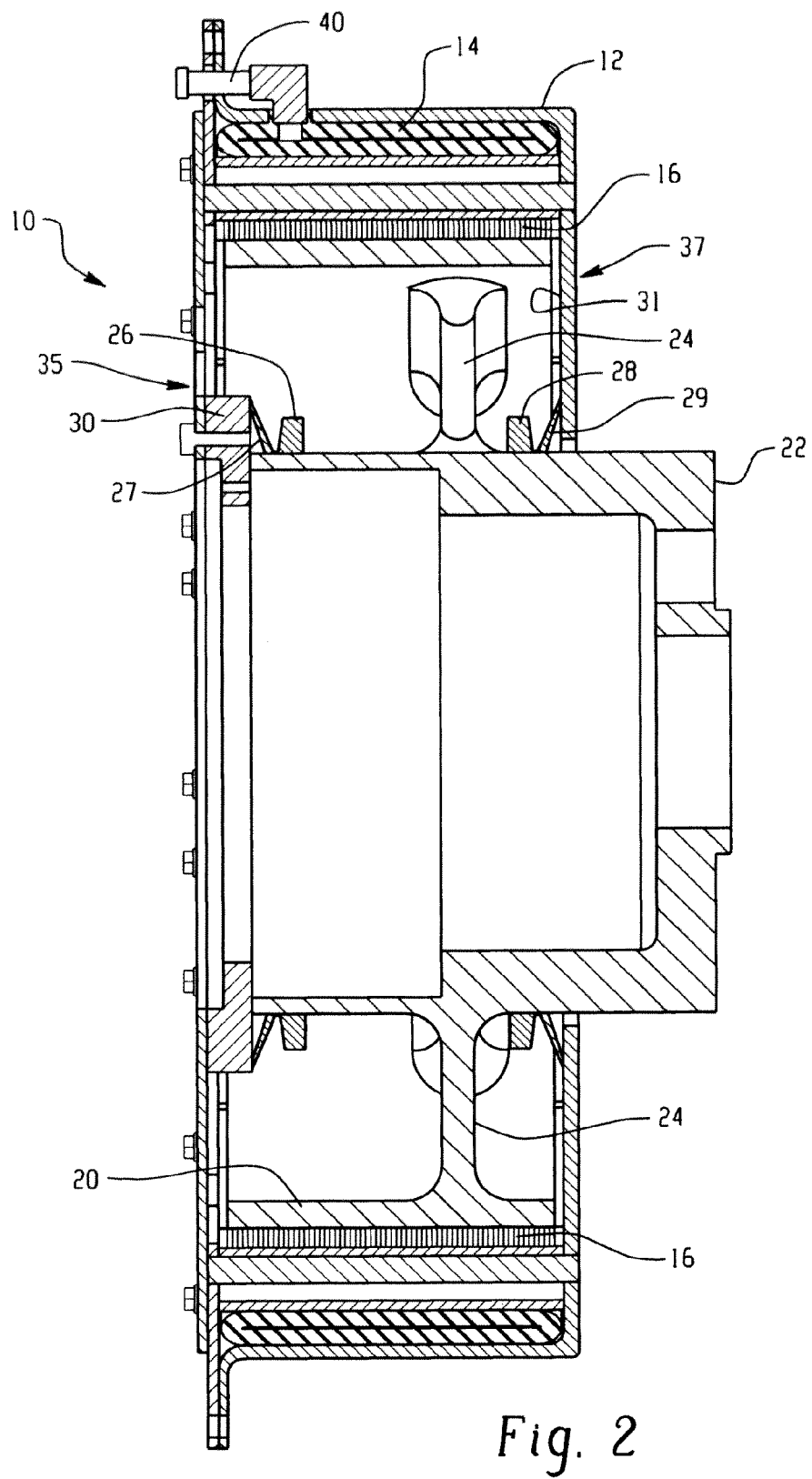
FIG. 2 is a sectional view along section-indicating lines B-B of the brake of FIG. 1.
Figure 3:
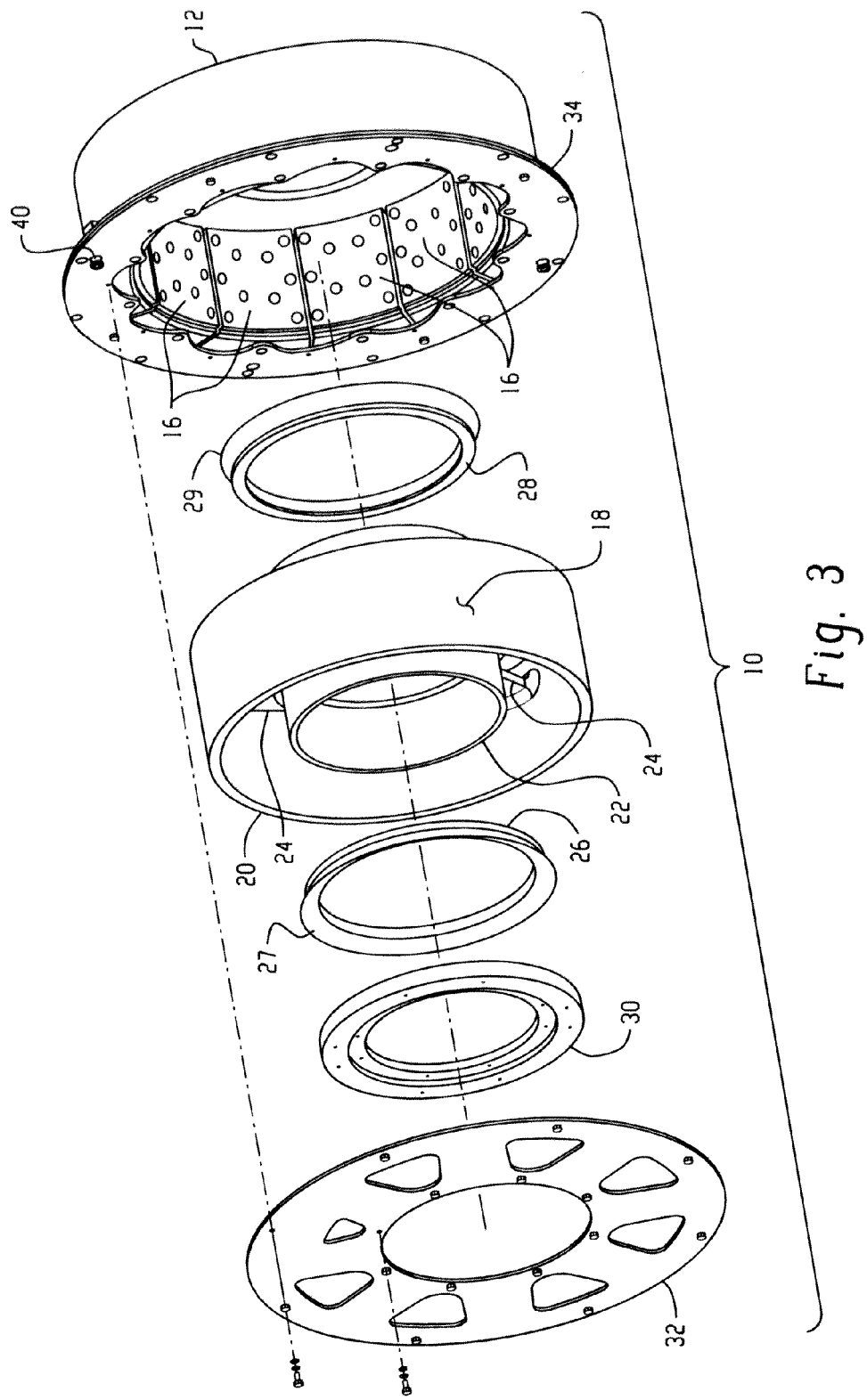
FIG. 3 is an exploded view of the brake assembly of FIG. 1.
Figure 4:
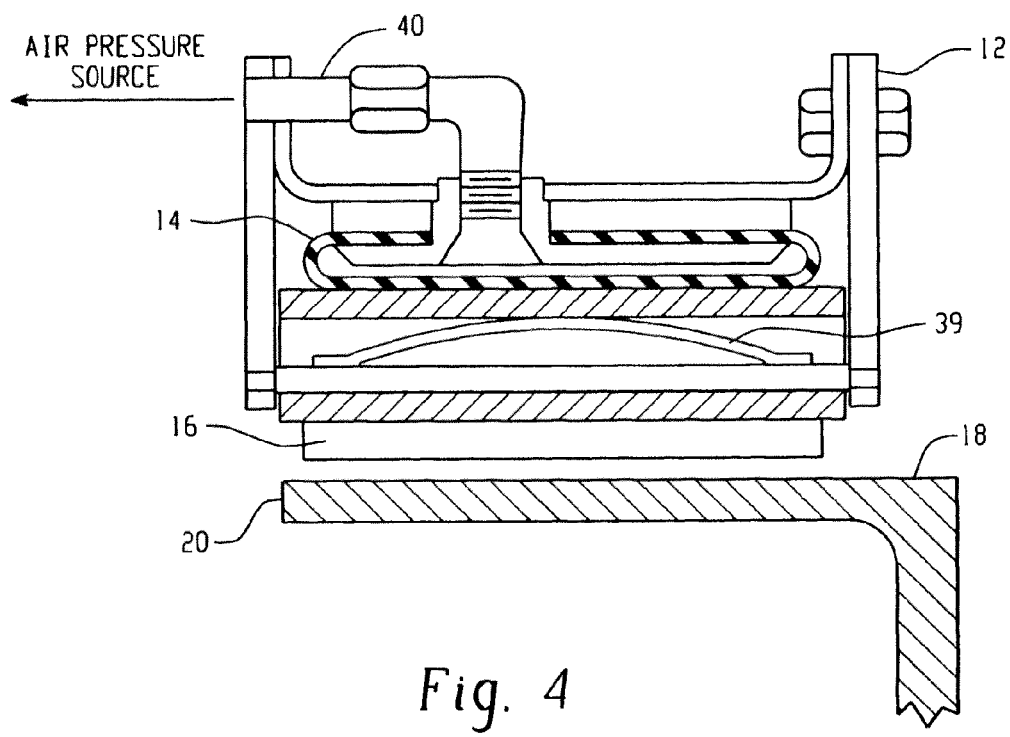
FIG. 4 is a view of a portion of FIG. 2 showing the brake in the unactuated condition.

FIGS. 1-5 of the drawings illustrate the brake assembly generally at 10 with stationary brake element or housing 12 having, in the exemplary illustrated version, a cylindrical cup shaped configuration which contains an annular inflatable tube 14 disposed about the interior of the housing; and, tube 14 surrounds an annular array of brake elements 16 disposed within the housing. Drum 20 has an inner annular hub 22 supported by spokes 24 and the hub has a hollow interior.

Upon inflation, tube 14 expands causing elements 16 to be constricted radially inwardly and causes the radially inner surfaces to frictionally engage the outer surface or circumference 18 of rotating drum 20 for effecting braking action.

A pair of annular seals 26, 28 are disposed, one on each opposite axial side of the hub 22 of the rotating drum and are secured thereon for rotation therewith. In the exemplary version illustrated, the seals 26, 28 each include a relatively thin wiper portion 27, 29 provided respectively thereon; and, the wipers 27, 29 may be formed integrally therewith. Seals 24, 26 may be formed of any suitable material, as, for example elastomeric material. The wipers 27, 29 operative respectively to contact in rotary sealing engagement stationary sealing surfaces 30, 31 provided on the housing and correspondingly located. At least one of the surfaces, such as surface 30, may include a bearing mount such as the exemplary illustrated adaptor ring. It will be understood that the ring 30 may include a mounting bearing (not shown) for the hub 22.

A protective cover 32 is attached to a flange 34 on the housing 12. In the exemplary version illustrated, bearing mount/seal adaptor ring 30 is mounted on the housing cover 32; however, other arrangements for providing a stationary sealing surface for seal ring 26 may be provided, such as, forming bearing mount integral with the cover 32.

Figure 5:
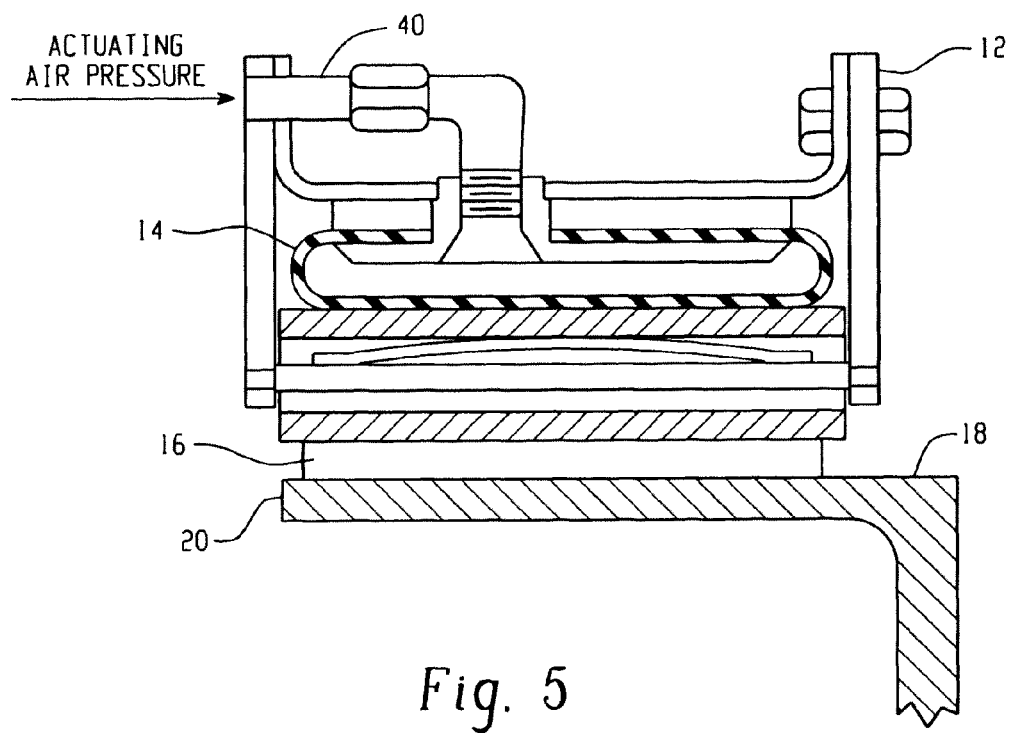
FIG. 5 is a view similar to FIG. 4 showing the brake in the actuated condition.

In operation, upon inflation of the annular tube 14 through the air supply connection 40, the annular tube 14 causes brake elements 16 to move radially inwardly, or to constrict, as shown in FIG. 5, against the outer surface 18 of the brake drum. In the exemplary version illustrated in FIGS. 4 and 5, a release spring(s) 39 is/are incorporated between inflatable tube 14 and brake element 16.

Figure 6:
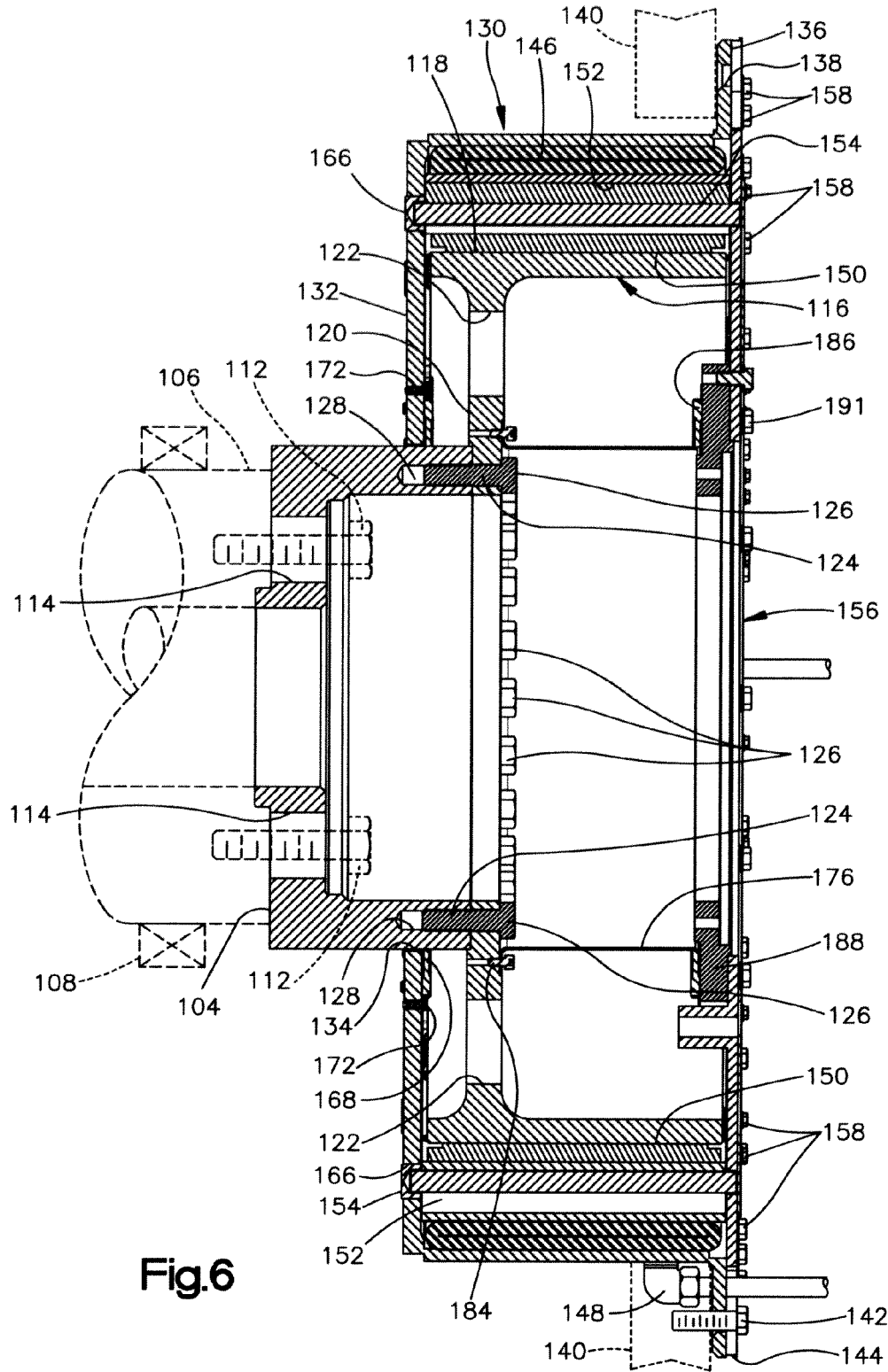
FIG. 6 is a section view of another version of the brake of the present disclosure and, FIG. 7 is an exploded view of the brake of FIG. 6.
Figure 7:
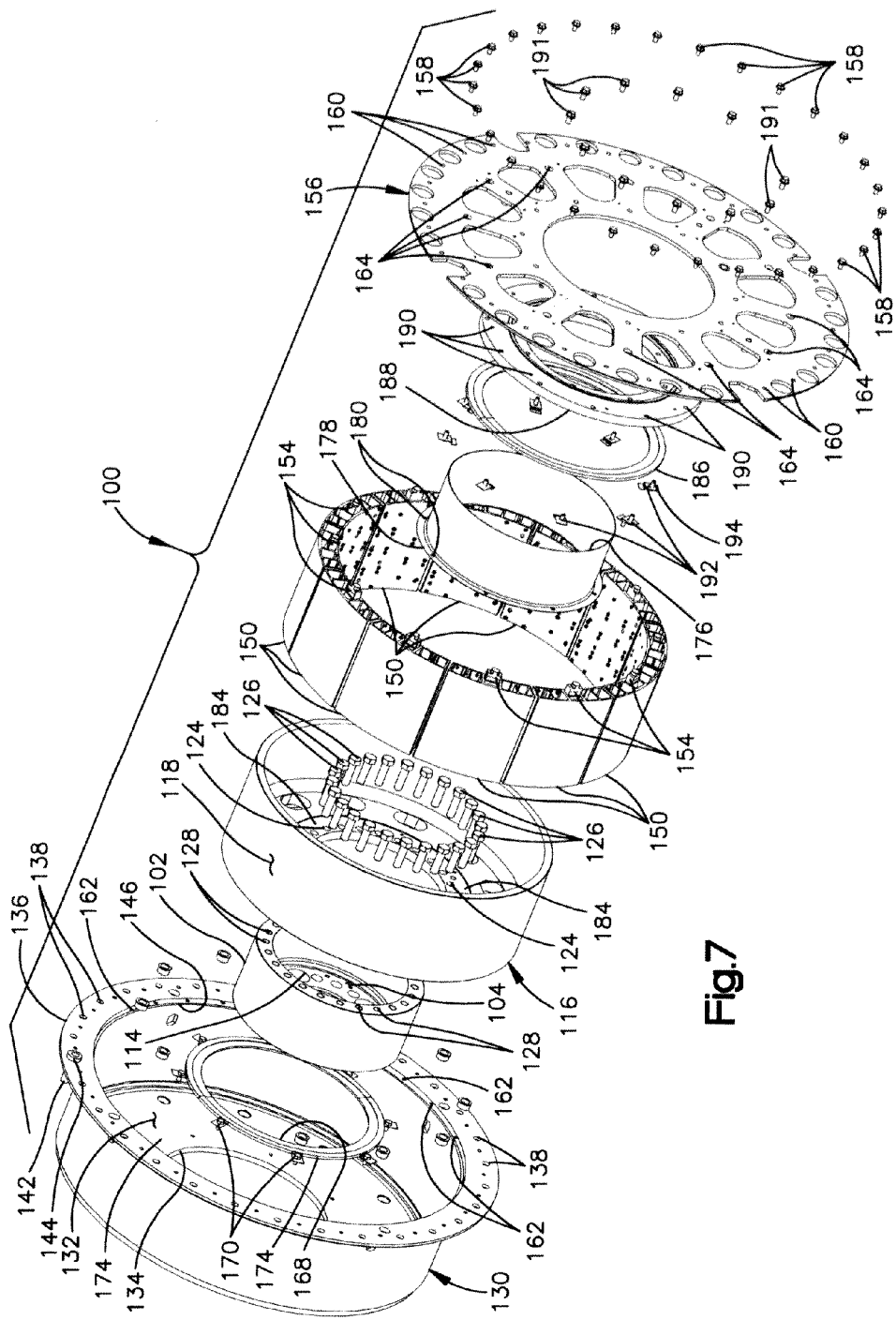

Referring to FIGS. 6 and 7, another version of the brake assembly of the present disclosure is indicated generally at 100 and has a hub 102 with a generally annular configuration and having an inwardly extending web portion 104 which is adapted for connection to an input shaft such as, for example, a gear shaft 106 shown in dashed outline such as for a wind turbine gear box, which shaft is typically supported by a bearing indicated in dashed outline at 108 in unshown gear box structure. The hub web 104 has a plurality of mounting holes 110 provided therethrough for enabling attachment to the input shaft 106 as, for example, by suitable fasteners such as bolts 112 indicated in dashed outline in FIG. 6. If desired, the web 104 may have additional apertures such as those denoted by reference numeral 114 for reducing the weight of the hub.

A brake drum indicated generally at 116 has a generally straight cylindrical friction or braking surface 118 provided on the outer periphery thereof and has a radially inwardly extending web 120 which may also have a plurality of holes such as denoted by reference numeral 122 for reducing the weight of the drum. The web 120 has a plurality of circumferentially spaced holes 124 through which are received fasteners such as bolts 126 which threadedly engage correspondingly located bores 128 provided in the hub 102.

A housing indicated generally at 130 has a generally annular configuration with an inwardly extending web portion 132 on one axial side thereof which is received over hub 102 with the inner periphery 134 thereof spaced closely adjacent the periphery of hub 102. Housing 130 has on the axially opposite side of web 132 a radially outwardly extending flange 136 which has a plurality of circumferentially spaced mounting holes 138 for attachment to a stationary structure, for example, a gear box housing or casing indicated generally at 140 in dashed outline in FIG. 6 and attached thereto by suitable fasteners, for example, bolts 142 with insulating spacers 144 provided under the head thereof.

Housing 130 has disposed therein against the inner periphery thereof an annular inflatable 146 which is operatively connected to an inlet fitting 148 provided in the housing 130 for inflation thereof.

A plurality of arcuately shaped brake elements or segments are disposed about the friction surface 118 of the break drum as denoted by reference numeral 150, each having a slot formed therethrough as denoted by reference numeral 152, each slot having a torque rod 154 received therethrough and extending axially therebeyond.

A side plate or cover indicated generally at 156 is received over the housing 130 and attached thereto by suitable fasteners such as, threaded bolts 158 received through a plurality of circumferentially spaced apertures 160. The bolts 158 threadedly engage correspondingly threaded bores 162 located immediately radially inwardly of the flange 136 as shown in FIG. 7.

The side plate 156 has a plurality of circumferentially spaced holes 164 disposed thereabout into each of which is received one end of a torque rod 154 in closely fitting engagement. The axially opposite end of each torque rod 154 is received in a correspondingly located aperture 166 provided in the web 132 of the housing 152. The slots 152 provided in the brake elements are elongated in the radial direction to permit radial movement of the brake elements; however, the width of the slot closely fits the torque rod 154 such that movement in the tangential or circumferential direction is prevented, thus enabling the brake elements, upon inflation of the inflatable bladder 146 to move radially inwardly constricting and exerting friction forces on the brake drum surface 118.

The inner surface of housing web 132 has mounted thereon an annular seal 168 which is operative to seal about the outer periphery of the hub 102 and which is retained upon the housing web by suitable expedients such as clips 170 (see FIG. 7) and threaded fasteners 172 (see FIG. 6) engaging corresponding threaded holes in the web of the housing as denoted by reference numeral 174 (see FIG. 7). In the present practice, the seal 168 is a brush seal; and, as shown in the drawings, is accessible from the interior of the housing for removal of the bolts 172.

An annular spacer 176 with a radially outwardly extending flange 178 (see FIG. 7) has a plurality of circumferentially spaced holes 180 (see FIG. 7) provided therein which each have received therethrough fasteners such as bolts 182 which threadedly engage apertures 184 provided in the drum web 120. It will be apparent from the arrangement illustrated, that the spacer 176 may be removed, if desired, from the cover plate side of the housing.

A second rotary seal 186 is mounted on an annular mounting plate 188 which is attached on the inner side of the side plate 156 by suitable fasteners such as bolts 191 circumferentially spaced thereabout and engaging correspondingly located threaded holes 190 provided in the mounting plate 188. The seal 186 is attached to the inner surface mounting plate 188 by a plurality of circumferentially spaced clips 192 secured to the inner surface of mounting plate 188 by fasteners such as bolts 194 threadedly engaging the annular mounting plate 188 from the inner side thereof (see FIG. 7). In the present practice, it has been found satisfactory to employ a brush type rotary seal for engaging the outer surface of the spacer 176; however, other types of seals may be employed, such as, for example, a flexible annular tip seal.

In service, both rotary seals 168 and 186 may be accessed from the side of the housing opposite hub 102 by removing bolts 158 in the side plate 156 and bolts 126 and removing the drum from the hub and housing to permit access to the rotary seal 168. It will be apparent that this can be accomplished without removing the housing 130 from its mounting or removing the hub 102 from the input shaft, thereby providing for ready access to the seal in the event replacement is necessary. The pneumatic constrictive drum brake of the present disclosure has application in wind turbine generator gear boxes where a significant amount of power is generated and requires a brake assembly having a drum braking surface of about 813 mm in diameter.

The drum brake of the present invention thus provides a single, relatively low cost technique for sealing the hub interior, from exterior contaminants such as moisture, brake dust and foreign matter. Rotary seals are provided on axially opposite sides of the hub and anchored to correspondingly located stationary surfaces provided on the housing to effect rotary sealing of the central region brake drum and hub. The rotary seals are both accessible from one axial side of the hub in service by removal of the housing side plate and brake drum, without requiring removal of the hub.

The exemplary embodiments have been described with reference to the present practice. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A pneumatic constricting drum brake comprising:
   (a) a rotor hub adapted for attachment to an input shaft;
   (b) a brake drum having an annular outer braking surface and an inwardly extending web removably attached to the hub from one side;
   (c) a plurality of radially movable brake elements disposed circumferentially about the braking surface;
   (d) a housing including a side plate removable from the one side disposed over the brake elements;
   (e) a first annular seal operatively disposed for sealing between the housing and the rotor hub, the seal being removable from said one side;
   (f) an inflatable disposed between the housing and the brake elements and operable upon inflation to move the brake elements inwardly into contact with the braking surface;
   (g) an annular spacer attached to the drum web;
   (h) a second annular seal disposed for sealing between the side plate and the spacer, wherein the side plate and drum are removable from the one side for permitting replacement of said first and second annular seal.

2. The drum brake defined in claim 1, wherein the first and second annular seal include brush seals.

3. The drum brake defined in claim 1, wherein the drum web is removably attached to the hub with a plurality of threaded fasteners.

4. The drum brake defined in claim 1, wherein the housing includes a fluid pressure inlet operatively connected to the inflatable for providing pressurized air thereto.

5. The drum brake defined in claim 1, wherein the side plate is removably attached to the housing with threaded fasteners.

6. The drum brake defined in claim 1, wherein the spacer is removably attached to the drum web with threaded fasteners.

7. The drum brake defined in claim 1, wherein the second annular seal is attached to an annular adapter plate mounted on the side plate.

8. The drum brake defined in claim 7, wherein the adapter plate is removably mounted to the side plate.

9. The drum brake defined in claim 1, wherein the second annular seal is attached to an annular adapter ring mounted to the side plate with threaded fasteners.

10. A method of making a pneumatic constricting drum brake comprising:
    (a) providing a rotor hub adapted for attachment to an input shaft;
    (b) providing a brake drum having an annular braking surface and an inwardly extending web and removably attaching the web to the rotor hub from one side thereof;
    (c) disposing a plurality of radially movable brake elements circumferentially about the braking surface;
    (d) disposing a housing including a side plate removable from the one side over the brake elements;
    (e) disposing a first annular rotary seal on the housing, removable from the one side and operative for sealing between the housing and the rotor hub;
    (f) disposing an inflatable between the brake elements and the housing for, upon inflation, moving the brake elements inwardly into contact with the braking surface; and,
    (g) attaching an annular spacer to the drum web and disposing a second annular rotary seal for sealing between the spacer and the side plate.

11. The method defined in claim 10, wherein the steps of disposing a first and second annular seal include disposing a brush seal.

12. The method defined in claim 10, wherein the step of removably attaching the drum web to the rotor hub includes using threaded fasteners.

13. The method defined in claim 10, wherein the step of disposing a second annular seal includes attaching an adapter ring to the side plate and mounting the second annular seal on the mounting plate.

14. The method defined in claim 10, wherein the step of disposing a housing includes disposing a housing with a side plate removably attached with threaded fasteners.

\* \* \* \* \*